United States Patent [19]

Iwaki et al.

[11] Patent Number: 5,293,995
[45] Date of Patent: Mar. 15, 1994

[54] STORAGE CASE FOR DISC-SHAPED RECORDING MEDIA CONTAINED WITHIN SUBSTANTIALLY FLAT RECTANGULAR HOUSINGS

[75] Inventors: Yuji Iwaki; Shuichi Kikuchi; Mika Kaneko, all of Miyagi; Toshiro Kobayashi, Kanagawa, all of Japan

[73] Assignee: Sony Corporation, Tokyo, Japan

[21] Appl. No.: 995,975

[22] Filed: Dec. 23, 1992

[30] Foreign Application Priority Data

Dec. 27, 1991 [JP] Japan .................. 03-346367

[51] Int. Cl.⁵ ............................. B65D 85/57
[52] U.S. Cl. ..................... 206/444; 206/472
[58] Field of Search ............ 206/303, 307–313, 206/387, 444, 472–475

[56] References Cited

U.S. PATENT DOCUMENTS

| | | | |
|---|---|---|---|
| 1,186,312 | 6/1916 | Hanselmann | 206/311 |
| 3,017,999 | 1/1962 | Cano . | |
| 3,077,263 | 2/1963 | Froehlig | 206/313 |
| 4,730,727 | 3/1988 | Petroff | 206/311 |
| 4,762,225 | 8/1988 | Henkel | 206/311 |
| 4,778,047 | 10/1988 | Lay . | |
| 4,823,950 | 4/1989 | Roze | 206/311 |
| 4,844,260 | 7/1989 | Jaw . | |
| 4,966,283 | 10/1990 | Sykes et al. | 206/312 |
| 5,176,250 | 1/1993 | Cheng | 206/313 |
| 5,188,228 | 2/1993 | Barrett | 206/313 |

FOREIGN PATENT DOCUMENTS

| | | | |
|---|---|---|---|
| 0205012 | 10/1920 | Canada | 206/312 |
| 0022652 | 1/1981 | European Pat. Off. . | |
| 0181994 | 5/1986 | European Pat. Off. . | |
| 0186359 | 7/1986 | European Pat. Off. . | |
| 9016544 | 2/1991 | Fed. Rep. of Germany . | |
| 0014492 | of 1908 | United Kingdom | 206/312 |

Primary Examiner—Jimmy G. Foster
Attorney, Agent, or Firm—William S. Frommer; Alvin Sinderbrand

[57] ABSTRACT

A storage case for disc-shaped recording media contained within respective substantially flat rectangular housings is constituted by a one-piece molded plastic member including a central spine having opposed side edges joined by flexible hinges with respective rectangular covers which are swingable between closed positions, in which the covers extend substantially parallel to each other from the spine with their inner surfaces in confronting relation, and opened positions in which the covers are spread angularly apart, elements on the covers for holding respective disc-shaped recording media in their rectangular housings against the inner surfaces of the respective covers, and a holder on the spine extending from the latter between the covers in the closed positions of the latter for embracing and holding at least one additional disc-shaped recording medium at an edge portion of its respective rectangular housing so as to accommodate such at least one additional disc-shaped recording medium in its respective housing between the disc-shaped recording media in their respective housings held against the inner surfaces of the covers.

12 Claims, 10 Drawing Sheets

STORAGE CASE FOR DISC-SHAPED RECORDING MEDIA CONTAINED WITHIN SUBSTANTIALLY FLAT RECTANGULAR HOUSINGS

BACKGROUND OF THE INVENTION

1. Field of the Invention

This invention relates to a storage case for containing disc-shaped recording media, such as, floppy discs or the like contained within respective substantially flat rectangular housings or envelopes.

2. Description of the Prior Art

For the purpose of storing a disc-shaped recording medium, such as, a floppy disc or the like contained within a substantially flat rectangular housing or envelope, it has been proposed to employ a storage case 1 of the type shown on FIG. 17. The storage case 1 includes a substantially rectangular base 2 having a peripheral wall 2a extending along three of its sides, and a rectangular lid 3 pivoted in respect to the base 2 and having a pocket or flat pouch 3a into which a rectangular housing or envelope containing a floppy disc or the like can be inserted when the lid 3 is in its illustrated open position. Thereafter, the lid 3 can be pivoted to a closed position seating on the edge of the peripheral wall 2a of the base. The known storage case 1 is usually molded of a material of relatively high rigidity, for example, having a flexural rigidity of about 35,000 kg/cm$^2$, such as, polystyrene, acrylatestyrene or the like.

In addition to the storage case 1 shown on FIG. 17, and which is intended to contain only one disc-shaped recording medium in its respective rectangular housing or envelope, it has been proposed to provide a storage case 1' of the type illustrated on FIG. 18, and which is molded of a relatively flexible material, such as, polypropylene or the like having a flexural rigidity of about 10,000 to 13,000 kg/cm$^2$. Such relatively flexible material has improved sealing characteristics and an aesthetically pleasing appearance, and may be readily employed for forming the storage case 1' so as to accommodate two floppy discs in their respective rectangular housings or envelopes. More particularly, as shown, the storage case 1' has a pair of rectangular lids or cover portions 2' and 3' pivotally connected to each other, at one edge, by a molded hinge 4' of reduced thickness so that the lids 2' and 3' are swingable relative to each other between the illustrated opened positions in which the lids 2' and 3' are spread angularly apart, and closed positions in which the lids are brought together with their inner surfaces in confronting relation. Each of the lids 2' and 3' has a peripheral rim formed thereon to define a shallow inner concavity for accommodating therein the rectangular housing or envelope 5 containing a respective floppy disc. The storage case 1' of FIG. 18 is an improvement over the storage case 1 of FIG. 17 in that the former is capable of storing two floppy discs in their respective rectangular housings or envelopes.

However, recently, the demand for disc-shaped recording media, such as, floppy discs or the like, has increased due to widespread employment of notebook-type personal computers and the like. Such increased demand for disc-shaped recording medium has led to a corresponding demand for storage cases in which the disc-shaped recording media can be safely and conveniently transported and stored. The note-type personal computers require the user to carry about at least two floppy discs, one being for data recording while the other is reserved for backup recording. However, it is preferably to have available three or more floppy discs. Since, as noted above with reference to FIG. 18, the existing storage cases have been designed to contain no more than two floppy discs, in those cases where it is desirable to have three or more floppy discs available, it is necessary to carry about at least two storage cases which is inconvenient.

OBJECTS AND SUMMARY OF THE INVENTION

Accordingly, it is an object of this invention to provide a storage case for three or more disc-shaped recording media, such as, floppy discs, contained within respective substantially flat rectangular housings.

Another object, is to provide a storage case, as aforesaid, which can be readily and inexpensively molded so as to be constituted by a one piece molded plastic member.

In accordance with an aspect of this invention, a storage case for disc-shaped recording media each contained within a respective substantially flat rectangular housing comprises a one-piece molded plastic member including a central spine portion having opposed side edges from which flexible hinge portions extend, and a pair of rectangular cover portions having respective side edges joined to the hinge portions so that the cover portions are swingable relative to each other about the hinge portions between closed positions, in which the cover portions extend substantially parallel to each other from the spine portion with inner surfaces of the cover portions in confronting relation, and opened positions in which the cover portions are spread angularly apart, means on the cover portions for holding respective disc-shaped recording media in their rectangular housings against the inner surfaces of the respective cover portions, and holder means on the spine portion extending from the latter between the cover portions in the closed positions of the latter for embracing and holding at least one additional disc-shaped recording medium at an edge portion of its respective rectangular housing so as to accommodate such at least one additional disc-shaped recording medium in its respective housing between the disc-shaped recording media in their respective housings held against the inner surfaces of the cover portions.

In accordance with another aspect of this invention, the holder means on the spine portion of the storage case includes flanges extending substantially parallel to the opposed side edges of the spine portion and being spaced apart from each other to frictionally retain therebetween the edge portion of the housing of the at least one additional disc-shaped recording medium. There may be two of such flanges spaced apart to accommodate therebetween only one additional disc-shaped recording medium in its respective housing, or the two flanges may be spaced apart by substantially a multiple of the thickness of the rectangular housing for each disc-shaped recording medium so that a corresponding plurality of the additional disc-shaped recording media in their housings can be accommodated in the holder means. In still another embodiment of the invention, at least three of the parallel flanges may extend from the spine portion of the storage case, with each of the flanges being spaced from each of the other flanges adjacent thereto by a distance approximately equal to the thickness of the rectangular housing for each disc-shaped recording medium so that a single disc-shaped recording medium in its housing is accommodated between each two adjacent flanges.

It is another feature of this invention to taper the flanges in the direction away from the spine portion so as to define confronting flange surfaces that diverge toward free edges remote from the spine portion for facilitating the entry of an edge portion of the housing of a disc-shaped recording medium between the confronting flange surfaces. Furthermore, spaced apart ribs desirably extend from the confronting flange surfaces substantially at right angles to the free edges thereof for defining limited zones at which the flanges frictionally grip the housing of a disc-shaped recording medium therebetween. It is also desirable, in accordance with this invention, to arrange the ribs extending from each of the confronting flange surfaces in offset relation to the ribs on the other of the flange surfaces.

The above, and other objects, features and advantages of this invention, will be apparent in the following detailed description of illustrative embodiments of the invention when read in connection with the accompanying drawings in which corresponding parts are identified by the same reference numerals in the several views thereof.

DESCRIPTION OF THE PREFERRED EMBODIMENTS

Figure 1:
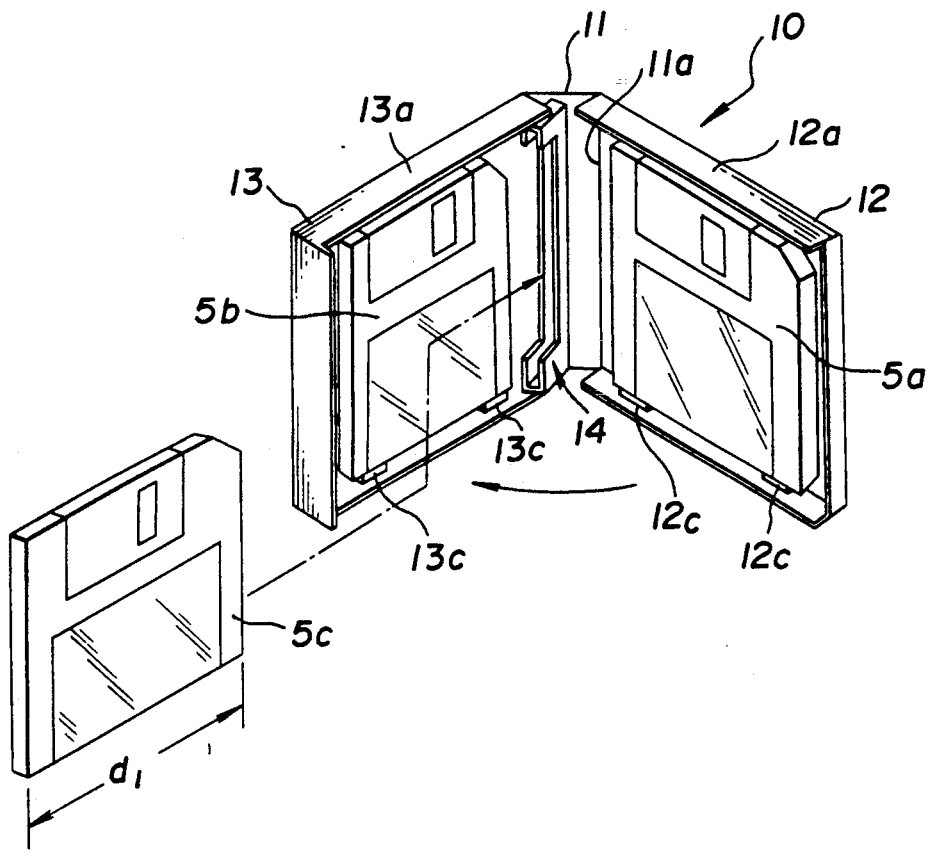
FIG. 1 is a schematic perspective view of a storage case in accordance with an embodiment of the present invention, shown in its opened condition.

Referring to the drawings in detail, and initially to FIG. 1 thereof, it will be seen that a storage case 10 in accordance with the embodiment of the invention there illustrated is intended to accommodate three disc-shaped recording media contained within respective substantially flat rectangular housings indicated at 5a, 5b and 5c. The storage case 10 is desirably a one-piece molded plastic member which includes a central spine portion 11 having opposed side edges from which flexible hinge portions 11a and 11b extend (FIG. 2), and a pair of rectangular cover portions 12 and 13 having respective side edges joined to the hinge portions 11a and 11b, respectively, so that the cover portions 12 and 13 are swingable relative to each other about the hinge portions between closed positions (FIG. 2) and opened positions (FIG. 1). The rectangular cover portions 12 and 13 have peripheral walls or rims 12a and 13a, respectively, extending along the three sides thereof other than the sides joined to the hinge portions 11a and 11b. In their closed positions (FIG. 2), the cover portions 12 and 13 extend substantially parallel to each other from the spine portion 11 and abut at the edges of the peripheral walls or rims 12a and 13a, with inner surfaces 12b and 13b of the cover portions 12 and 13 being in confronting relation.

At the side portions of the peripheral walls 12a and 13a which extend at right angles to the hinge portions 11a and 11b, there may be provided internal pads or raised portions 12c and 13c (FIG. 1) which are dimensioned for frictionally engaging respective edges of the rectangular housings 5a and 5b containing disc-shaped recording media for holding the latter against the inner surfaces 12b and 13b, respectively of the cover portions 12 and 13. It will be apparent that, when the cover portions are spread angularly apart to their opened positions shown on FIG. 1, the disc-shaped recording media contained within the respective substantially flat rectangular housings 5a and 5b can be readily installed within the shallow inner concavities of the cover portions 12 and 13 and there frictionally held against the inner surfaces 12b and 13b by the pads 12c and 13c.

In accordance with the present invention, the storage case 10 is further shown to comprise a holder 14 situated on the spine portion 11 and extending from the latter between the cover portions 12 and 13 in the closed positions of the latter (FIG. 2) for embracing and holding an additional disc-shaped recording medium at an edge portion of its respective rectangular housing 5c so as to accommodate such additional disc-shaped recording medium in its respective housing between the disc-shaped recording media contained in the housings 5a and 5b held against the inner surfaces 12b and 13b of the cover portions 12 and 13.

Figure 2:
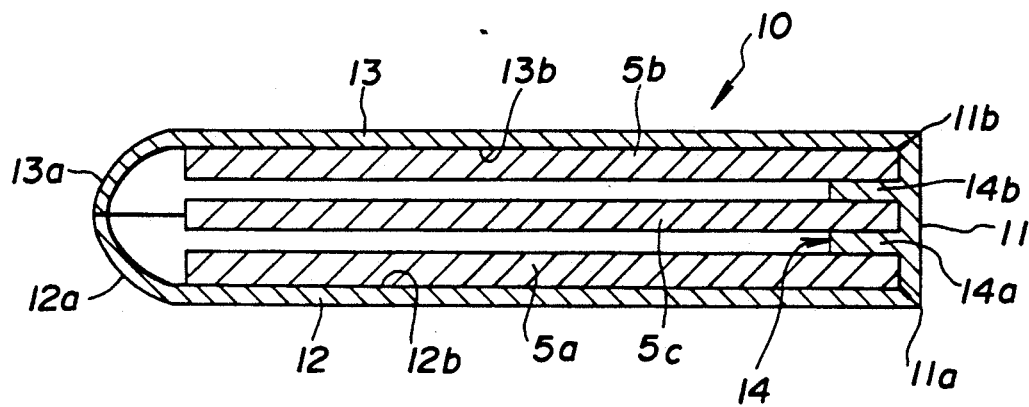
FIG. 2 is an enlarged schematic sectional view showing the storage case of FIG. 1 in its closed condition, and with housings or envelopes of three floppy discs contained therein.

More specifically, the holder 14 on the spine portion 11 is shown to include flanges 14a and 14b extending substantially parallel to the opposed side edges of the spine portion and being spaced apart from each other to frictionally retain therebetween an edge portion of the housing 5c of the additional disc-shaped recording medium, as shown on FIG. 2. In order to frictionally retain the edge portion of the housing or envelope 5c between the flanges 14a and 14b, the distance T (FIG. 4) between the inner surfaces of the flanges 14a and 14b may be made slightly smaller than the thickness of the housing or envelope 5c. For example, in the case of a 3.5 inch floppy disc which is contained in a housing or envelope having a thickness of 3.3 mm, the distance T between the flanges may be about 3.0 mm.

Figure 3:
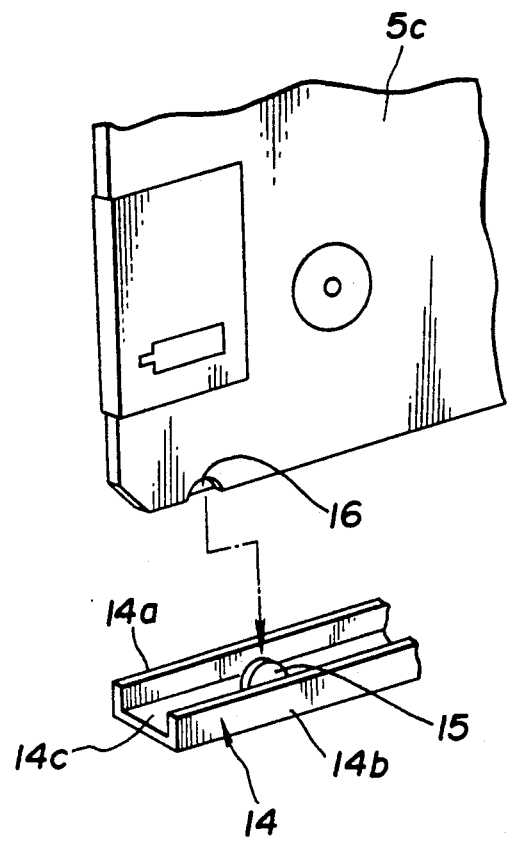
FIG. 3 is a fragmentary enlarged schematic perspective view showing a portion of a holder included in the storage case of FIG. 1 and to which reference will be made in explaining its cooperation with the housing or envelope of a floppy disk to be held therein.
Figure 4:
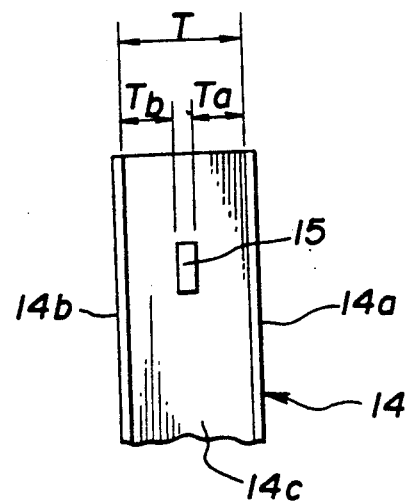
FIG. 4 is a fragmentary enlarged elevational view of the portion of the storage case shown in FIG. 3.

Further, as shown on FIGS. 3 and 4, a substantially semi-circular projection 15 may extend from the web 14c of the holder 14 between the flanges 14a and 14b at a location adjacent one end of the holder so as to be engageable in a similarly shaped recess 16 formed in an edge of the housing 5c of the floppy disc or other disc-shaped recording medium. Such recess 16 is conventionally provided in the housing or envelope 5c of a floppy disc or other disc-like recording medium for positioning the latter when inserted into a disc drive (not shown). The engagement of the projection 15 in the recess 16 ensures that the housing or envelope 5c of a disc-like recording medium will have a predetermined orientation within the storage case 10. In the case where the storage case 10 is intended for the storage of 3.5 inch floppy discs each contained in a housing or envelope having a thickness of about 3.3 mm, the distances $T_a$ and $T_b$ between the opposite sides of the projection 15 and the inner surfaces of the flanges 14a and 14b, respectively, are each about 1.0 m.

As shown particularly on FIG. 2, the opposed side edges of the spine portion 11 from which the hinge portions 11a and 11b extend may be laterally spaced outwardly from the flanges 14a and 14b by distances each approximately equal to the thickness of each of the housings 5a and 5b containing a disc-shaped recording medium. Therefore, such housings 5a and 5b held against the inner surfaces of the respective cover portions 12 and 13 can, in the closed positions of the cover portions, extend between the flange 14a and cover portion 12 and between the flange 14b and cover portion 13, respectively, as shown on FIG. 2.

In the embodiment of this invention described above with reference to FIGS. 1-4, the holder 14 on the spine portion 11 has only two flanges 14a and 14b spaced apart by a distance approximately equal to the thickness of the housing or envelope 5c containing a disc-shaped recording medium so that the storage case 11 according to such embodiment can accommodate only a single disc-shaped recording medium in addition to the disc-shaped recording media contained in the housings 5a and 5b held against the inner surfaces 12b and 13b of the cover portions 12 and 13. However, as shown in FIGS. 5 and 6, storage cases 10' and 10" in accordance with other embodiments of the present invention may be arranged to hold more than the three disc-shaped recording media that can be accommodated within their respective housings in the storage case 10 of FIGS. 1 and 2.

Figure 5:
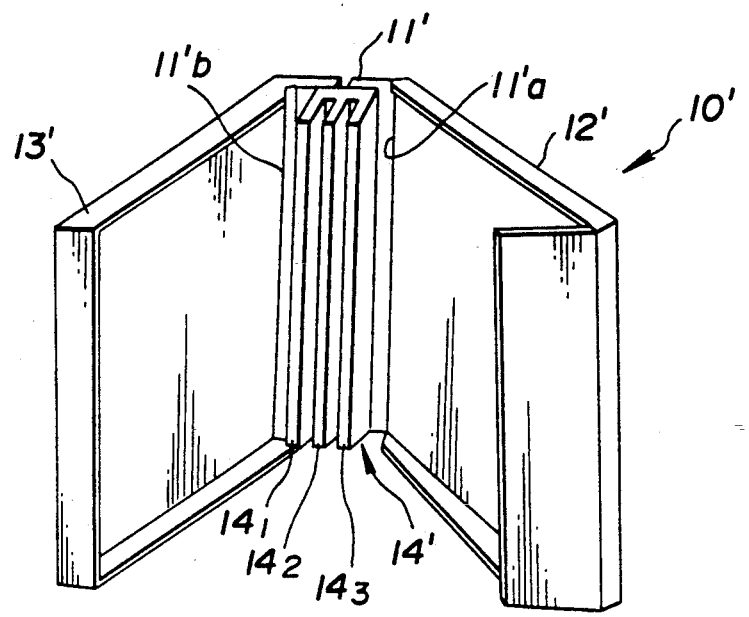
FIGS. 5 and 6 are schematic perspective views of storage cases in accordance with two other respective embodiments of the present invention, and which are shown in their opened conditions.

More specifically, in the storage case 10' of FIG. 5, the spine portion 11' has an increased width between its opposite side edges which are connected by hinge portions 11'a and 11'b to cover portions 12' and 13', respectively. In this case, the holder 14' extending from the spine portion 11' has three flanges $14_1$, $14_2$ and $14_3$ extending substantially parallel to the opposed side edges of the spine portion, with each of the flanges $14_1$, $14_2$ and $14_3$ being spaced from each of the other flanges adjacent thereto by a distance approximately equal to the thickness of the rectangular housing for each of the disc-shaped recording media. Thus, in addition to the rectangular housings of the disc-shaped recording media that can be stored against the inner surfaces of the cover portions 12' and 13', the storage case 10' is adapted to embrace and frictionally hold edge portions of the housings of two disc-shaped recording media between the flanges $14_1$ and $14_2$ and between the flanges $14_2$ and $14_3$, respectively.

Figure 6:
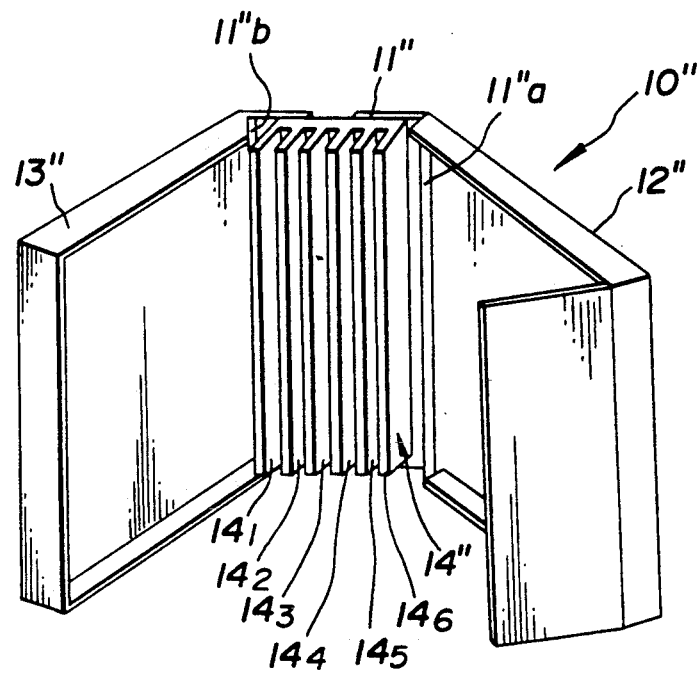
Figure 7:
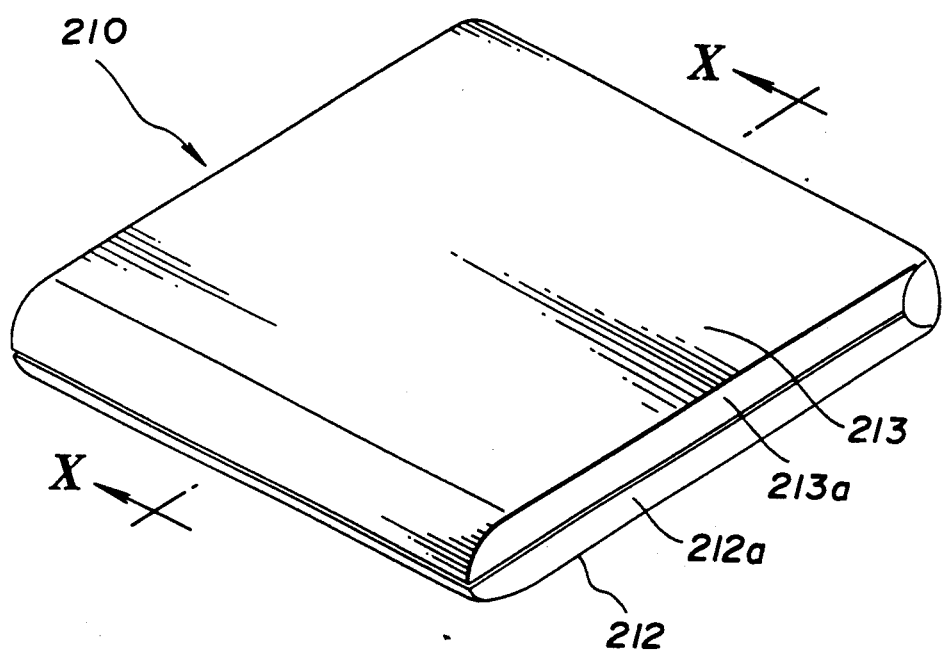
FIG. 7 is a perspective view of a storage case in accordance with still another embodiment of the present invention, and which is shown in its closed condition.

Similarly, in the storage case 10" of FIG. 6, the width of the spine portion 11" between the cover portions 12" and 13" is further increased so that the holder 14" may be provided with six spaced apart flanges $14_1$, $14_2$, $14_3$, $14_4$, $14_5$ and $14_6$ extending parallel to the opposite side edges of the spine portion at which the hinge portions 11"a and 11"b connect the spine portion to the cover portions 12" and 13", respectively. Once again, in the embodiment of FIG. 6, each of the flanges $14_1$-$14_6$ is spaced from each of the other flanges adjacent thereto by a distance approximately equal to the thickness of the rectangular housing for each of the disc-shaped recording media so that five recording media contained in their respective housings can be frictionally held, at edge portions, between the six flanges of the holder 14", while two other disc-shaped recording media in their respective rectangular housings are held against the inner surfaces of the cover portions 12" and 13", respectively.

In each of the storage cases 10' and 10" having holders 14' and 14" extending from the spine portions for holding a plurality of disc-shaped recording media in their respective housings in addition to the recording media held against the inner surfaces of the cover portions, each of the disc-shaped recording media to be held, at an edge portion of its rectangular housing, by the holder 14' or 14" is embraced by two of the flanges of such holder. Therefore, each of the holders 14' and 14" has a number of flanges that is one greater than the number of additional disc-shaped recording media to be accommodated in the holder 14' or 14". In other words, the holder 14' for accommodating two additional disc-shaped recording media has three flanges, while the holder 14" for accommodating five additional disc-shaped recording media has six flanges. The increased number of flanges provided on each of the holders 14' and 14" has the disadvantage of increasing the width of the holder, and hence the width of the spine portion 11' or 11" of the storage case.

Figure 15:
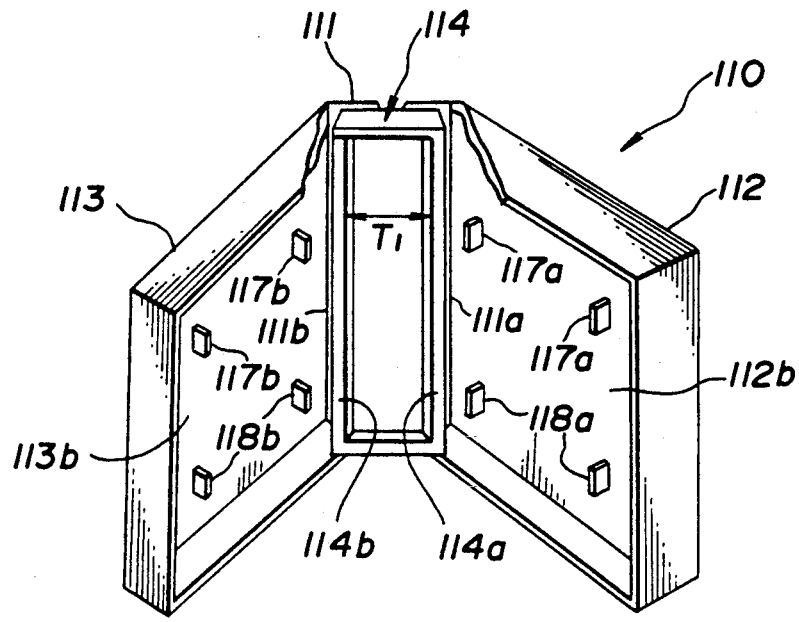
FIG. 15 is a schematic perspective view of a storage case in accordance with yet another embodiment of the present invention, and which is shown in its opened condition.
Figure 16:
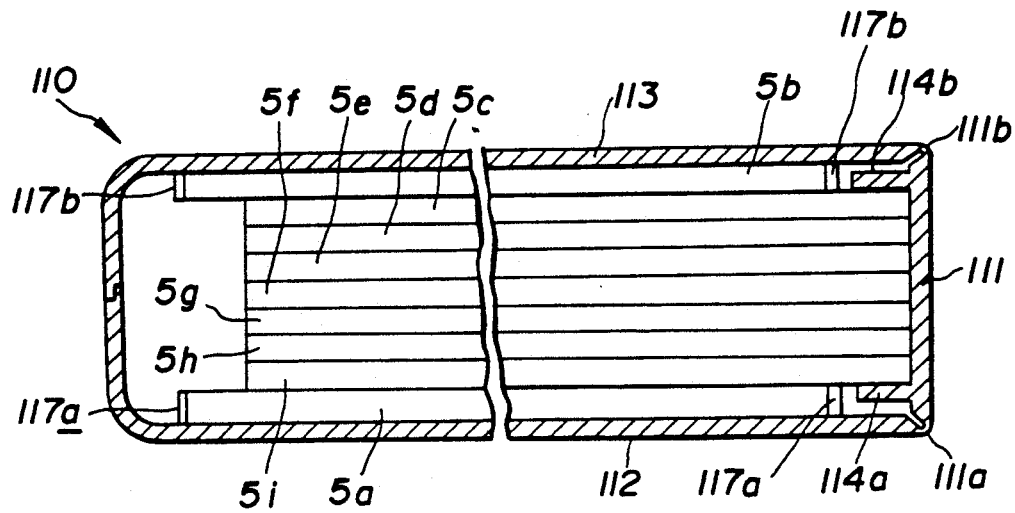
FIG. 16 is an enlarged schematic sectional view showing the storage case of FIG. 15 in its closed condition, and with housings or envelopes of a relatively large number of floppy discs contained therein.
Figure 17:
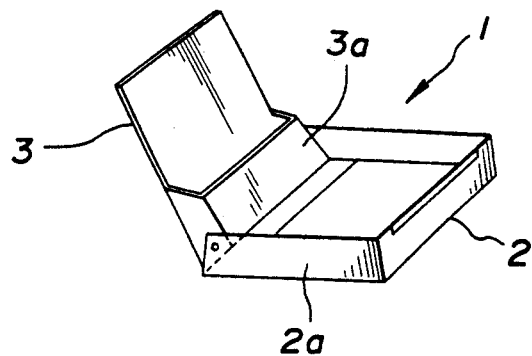
FIGS. 17 and 18 are schematic perspective views of respective types of storage cases according to the prior art and which are shown in their open conditions.
Figure 18:
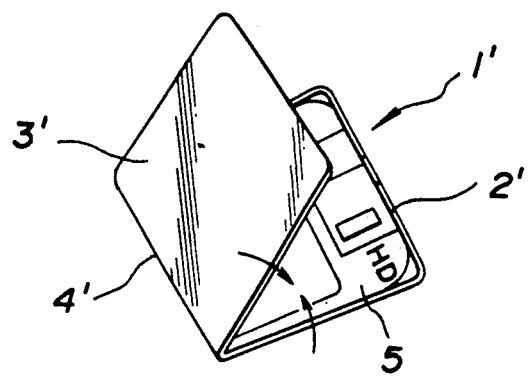

However, as shown on FIGS. 15 and 16, a storage case 110 adapted to accommodate a relatively large number of disc-shaped recording media in their housings according to another embodiment of this invention may have a holder 114 with only two flanges 114a and 114b extending from its spine portion 111 so as to extend between the cover portions 112 and 113 when the latter are swung relative to each other about hinge portions 111a and 111b from the angularly spread apart positions of FIG. 15 to the closed positions of FIG. 16. The two flanges 114a and 114b extend parallel to the hinge portions 111a and 111b at the opposite side edges of the spine portion 111, and are spaced from each other by a distance $T_1$ that is substantially a multiple of the thickness of the rectangular housing for each of the disc-shaped recording media. For example, in the illustrated embodiment, the distance $T_1$ between the flanges 114a and 114b of the holder 114 is substantially 7 times the thickness of each rectangular housing for a disc-shaped recording medium. In such case, and as shown particularly on FIG. 16, 7 housings 5c, 5d, 5e, 5f, 5g, 5h and 5i containing respective disc-shaped recording media can be stacked between the flanges 114a and 114b of the holder 114 and frictionally held by the latter.

Furthermore, in the storage case 110, the means in the cover portions 112 and 113 for holding housings 5a and 5b containing respective disc-shaped recording media against the inner surfaces 112b and 113b of the cover portions 112 and 113, respectively, are constituted by integral pairs of spaced apart lugs 117a and 118a, and 117b and 118b, extending from the inner surfaces of the cover portions 112 and 113, respectively, with the distance between the paired lugs 117a and 118a, and between the paired lugs 117b and 118b being approximately equal to one of the orthogonal dimensions, for example, the dimension $d_1$ (FIG. 1), of the rectangular housing of a disc-shaped recording medium to be held thereby. Therefore, the disc-shaped recording media in the rectangular housings 5a and 5b are held against the inner surfaces of the respective cover portions 112 and 113 by frictional engagement of the lugs 117a and 118a with the opposed edges of the housing 5a, and by frictional engagement of the lugs 117b and 118b with the opposite edges of the housing 5b, as shown on FIG. 16.

Further, as shown on FIG. 16, the lugs of the pairs of lugs 117a and 117b and the lugs of the pairs of lugs 118a and 118b which are closest to the hinge portions 111a and 111b are spaced from the latter by distances at least as large as the depth of the flanges 114a and 114b measured from the spine portion ill so that the housings 5a and 5b held by the lugs against the inner surfaces of the cover portions 112 and 113 will clear the flanges 114a and 114b when the cover portions are in their closed positions. The foregoing arrangement further makes it possible to reduce the overall width of the closed storage case 110 while accommodating a relatively large number of disc-shaped recording media therein.

Figure 8:
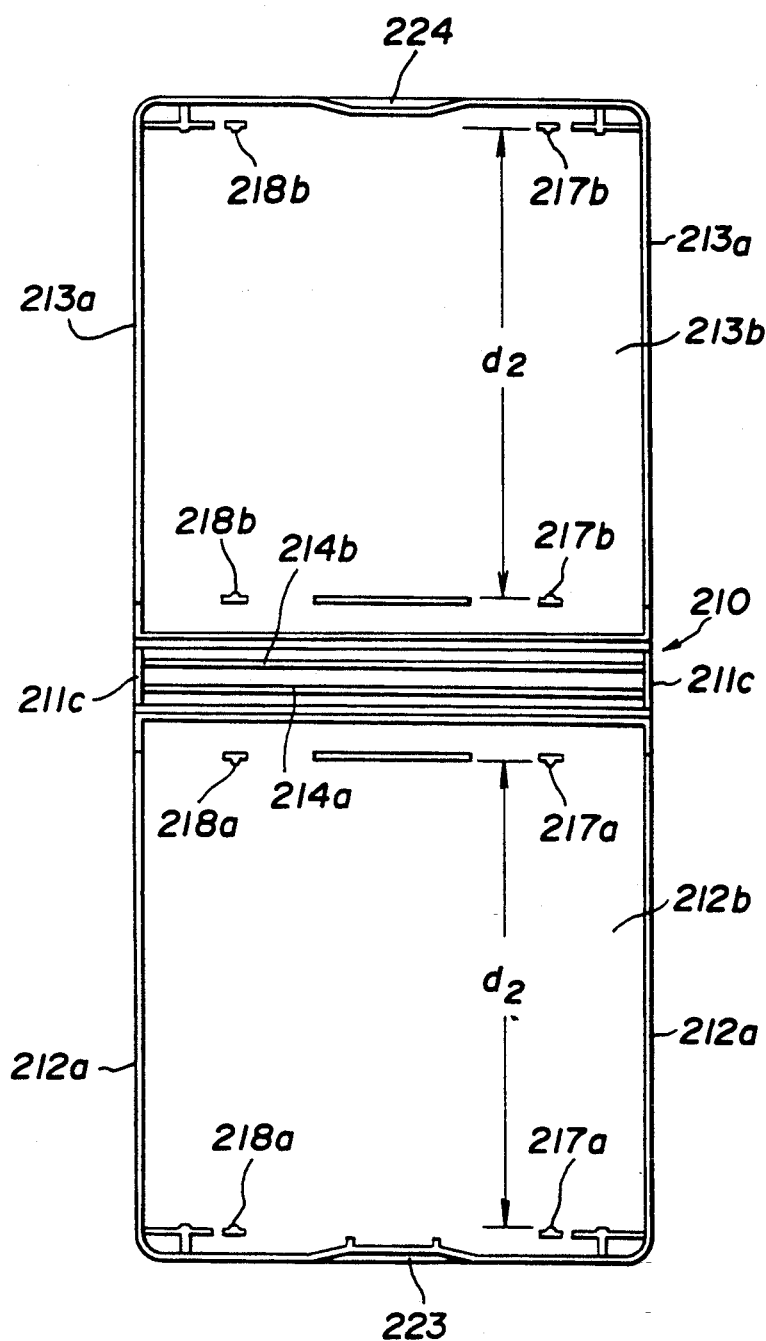
FIG. 8 is a plan view of the storage case of FIG. 7 shown in its fully opened condition so as to make visible the interior configuration thereof.
Figure 9:
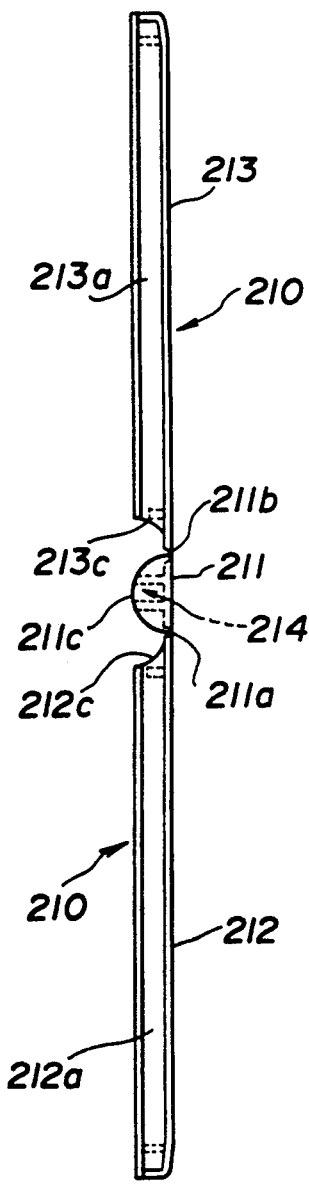
FIG. 9 is a side elevational view of the storage case of FIG. 8.
Figure 10:
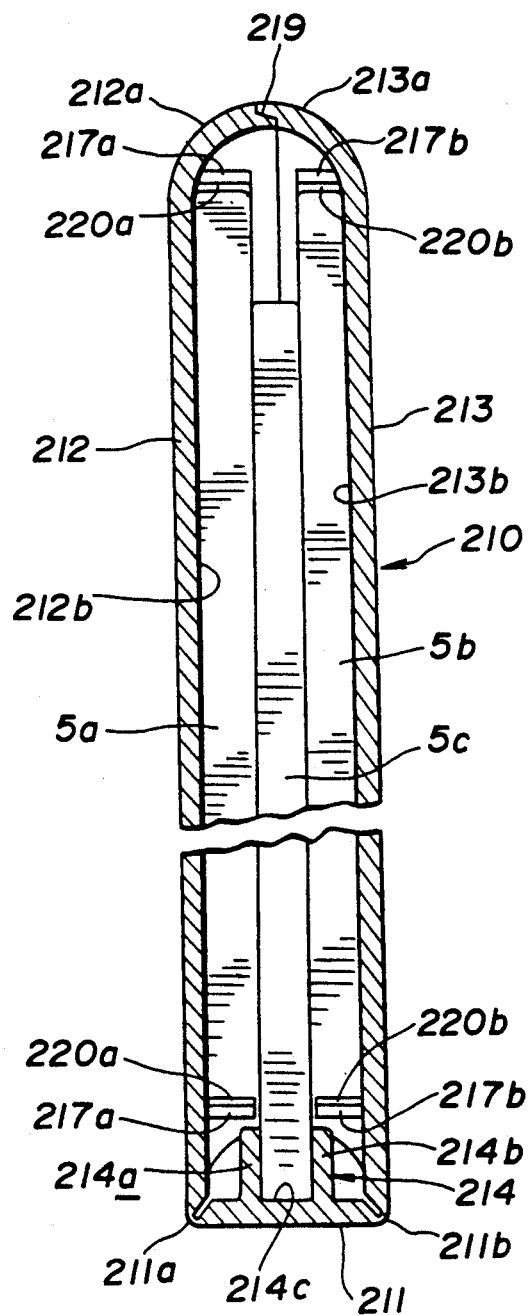
FIG. 10 is an enlarged sectional view taken along the line X—X on FIG. 7 and which shows the storage case in its closed condition with three housings containing floppy discs disposed within the storage case.

Referring now to FIGS. 7-14, it will be seen that, in accordance with a practical embodiment of the present invention, a storage case 210 is provided which, as in the case of the storage case 10 of FIGS. 1 and 2, is adapted to accommodate a total of three floppy discs or other disc-shaped recording media in their respective rectangular housings or envelopes 5a, 5b and 5c (FIG. 10). More specifically, the storage case 210 is shown to be constituted by a one-piece molded plastic member which includes a central spine portion 211 having opposed side edges tapering into flexible hinge portions 211a and 211b of reduced thickness (FIG. 14) to which tapering side edges of rectangular cover portions 212 and 213, respectively, are integrally joined so that such cover portions are swingable relative to the spine portion 211, and hence relative to each other, about the hinge portions 211a and 211b between closed positions (FIG. 10) and opened positions (FIG. 9). The rectangular cover portions 212 and 213 have peripheral walls or rims 212a and 213a, respectively, extending along the three sides of the cover portions which are not joined to the hinge portions 211a and 211b. In the closed positions of cover portions 212 and 213, their inner surfaces 212b and 213b confront and extend substantially parallel to each other from the spine portion 211 with the edges of the peripheral walls or rims 212a and 213a being in abutting interlocking engagement with each other, as at 219 on FIG. 10.

In the storage case 210, means are provided in the cover portions 212 and 213 for holding housings 5a and 5b (FIG. 10) containing respective disc-shaped recording media against the inner surfaces 212b and 213b of the cover portions 212 and 213, respectively. As shown on FIGS. 8, 10 and 11, such means for holding housings 5a and 5b against the inner surfaces 212b and 213b are constituted by pairs of spaced apart lugs 217a and 218a projecting integrally inward from the surface 212b of cover portion 212, and by similar pairs of spaced apart lugs 217b and 218b projecting integrally inward from the inner surface 213b of cover portion 213. As shown on FIG. 8, the distances $d_2$ between the paired lugs 217a and between the paired lugs 218a, and between the paired lugs 217b and the paired lugs 218b are approximately equal to the orthogonal dimension $d_1$ (FIG. 1) of the rectangular housing of a disc-shaped recording medium to be held thereby (FIG. 1). Furthermore, as shown particularly on FIG. 11, the surfaces of the paired lugs 217a and of the paired lugs 218a are formed with raised ridges 220a, and the facing surfaces of the paired lugs 217b and of the paired lugs 218b are similarly formed with raised ridges 220b. Thus, when the rectangular housings 5a and 5b containing respective disc-shaped recording media are inserted between the lugs 217a and 218a, and between the lugs 217b and 218b, respectively, with the cover portions 212 and 213 in their opened positions, the ridges 220a and 220b frictionally press against the adjacent side edges of the housings 5a and 5b, respectively, for holding such housings against the inner surfaces 212b and 213b of the cover portions.

In accordance with the present invention, the storage case 210 is further shown to comprise a holder 214 integrally situated on the spine portion 211 and extending from the latter between the cover portions 212 and 213 in the closed positions of the latter (FIG. 10) for embracing and holding the additional disc-shaped recording medium at an edge portion of its respective rectangular housing 5c so as to accommodate such additional disc-shaped recording medium in its respective housing between the disc-shaped media contained in the housings 5a and 5b held against the inner surfaces 212b and 213b of the cover portions 212 and 213 when the latter are in their closed positions (FIG. 10).

Figure 11:
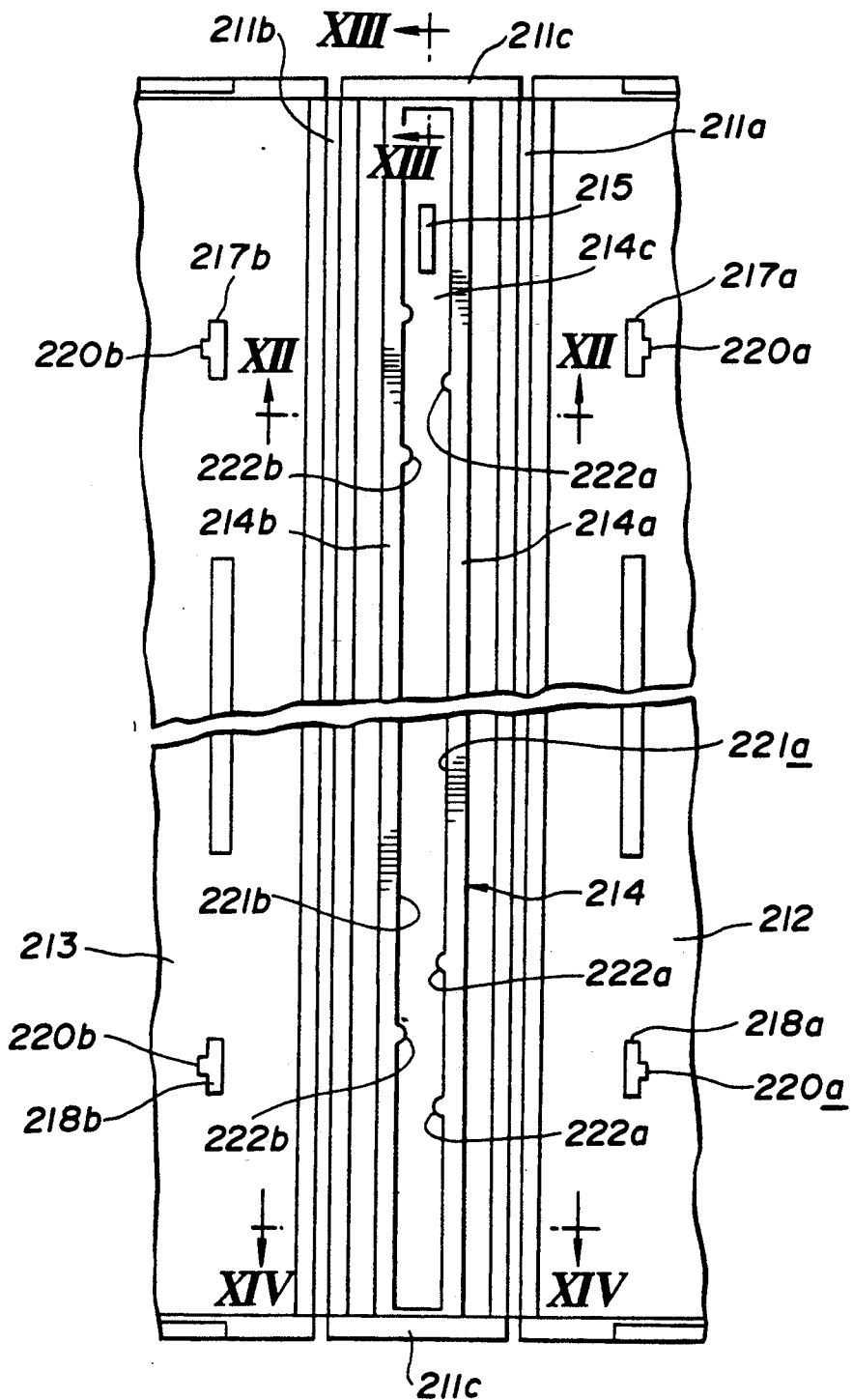
FIG. 11 is an enlarged fragmentary plan view showing a portion of the storage case of FIGS. 7-10 in its opened condition for illustrating details thereof.
Figure 12:
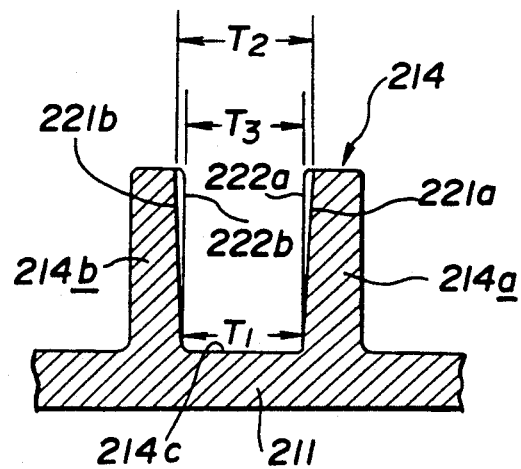
FIGS. 12, 13 and 14 are further enlarged fragmentary sectional views taken along the lines XII—XII, XIII—XIII and XIV—XIV, respectively, on FIG. 11.
Figure 13:
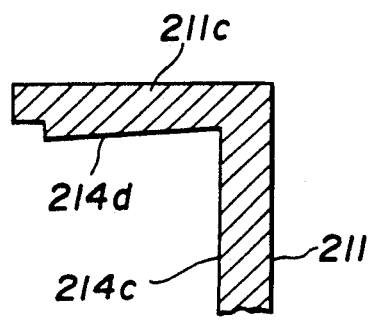
Figure 14:
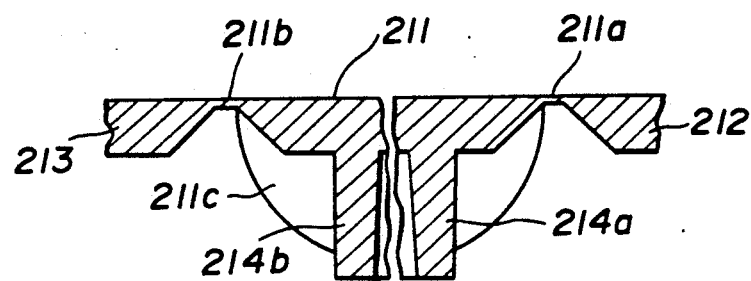

As shown specifically on FIGS. 11 and 12, the holder 214 includes flanges 214a and 214b extending integrally from the spine portion 211 parallel to the opposed side edges of the latter and being spaced apart from each other to frictionally retain therebetween an edge portion of the housing 5c containing a disc-shaped recording medium. More specifically, in the embodiment of the invention being now described, the thicknesses of the flanges 214a and 214b taper in the direction away from the spine portion 211 so as to provide confronting flange surfaces 221a and 221b that diverge toward free edges of the flanges 214a and 214b and thereby facilitate the entry of an edge portion of the housing 5c between the confronting flange surfaces (FIG. 12). Further, spaced apart ribs 222a and 222b extend from the confronting flange surfaces 221a and 221b, respectively, substantially at right angles to the free edges thereof for defining limited zones at which the flanges 214a and 214b will frictionally grip the housing 5c of a disc-shaped recording medium inserted therebetween. By way of example, in the case of a 3.5 inch floppy disc which, as earlier noted, is contained in a housing or envelope having a thickness of 3.3 mm, the distance $T_1$ (FIG. 12) between the base portions of the flanges 214a and 214b may be 3.5 mm, and such distance may diverge to a maximum dimension $T_2$ of about 3.8 mm at the free edges of the flanges, while the lateral distance measured between the ribs 222a and 222b is 3.3 mm for gripping the housing or envelope of a 3.5 inch floppy disc therebetween.

As is shown on FIG. 11, the ribs 222a extending from the flange surface 221a are offset, in the direction along the respective flange 214a, relative to the ribs 222b extending from the surface 221b of the flange 214b. By reason of such offset relationship of the ribs 222a and 222b, the frictional engagement of the holder 214 with an edge portion of the housing 5c is effected at different locations on opposed surfaces of the housing 5c so that the latter can be reliably frictionally held without jamming between the ribs 222a and 222b.

Further, as shown on FIG. 11, a substantially semicircular projection 2115 may extend from the bottom surface 214c of the holder 214 between flanges 214a and 214b at a location adjacent one end of the holder so as to be engagable in the similarly shaped recess 16 formed in an edge of the housing 5c of the floppy disc or other disc-shaped recording medium, as previously described with reference to FIG. 3. The opposite ends of the spine portion 211 are formed with semi-circular end plates 211c (FIGS. 9 and 14) which are integral with the adjacent ends of the flanges 214a and 214b. As shown particularly on FIG. 9, the ends of the peripheral walls or rims 212a and 213a on cover portions 212 and 213, respectively, that are adjacent the spine portion 211 have arcuate end edges 212c and 213c which mate with the semi-circular end plates 211c when the cover portions 212 and 213 are in their closed positions. As shown particularly on FIG. 13, the surface 214d of each end plate 211c which faces in the direction toward the space between flanges 214a and 214b is undercut in the direction toward the surface 214c of the holder 214. Thus, when the housing 5c of a floppy disc or other disc-shaped recording medium is inserted between flanges 214a and 214b of the holder 214, the end surfaces 214d of the holder engage the adjacent edge surfaces of the housing 5c only at locations spaced from the surface 214c so as to again avoid jamming of the housing 5c in the holder 214.

Finally, as shown schematically on FIG. 8, suitably cooperative latch elements 223 and 224 are desirably molded as integral parts of the rims 212a and 213a of cover portions 212 and 213 for releasably holding the latter in their closed positions.

It is to be appreciated that the described storage cases embodying the present invention are desirably injection molded as one-piece integral members of a relatively flexible plastic material, such as, polypropylene or the like and, in each instance, are capable of conveniently accommodating three or more floppy discs or other disc-shaped recording media in their respective housings or envelopes.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A storage case for disc-shaped recording media each contained within a respective substantially flat rectangular housing, said storage case comprising a one-piece molded plastic member including a central spine portion having opposed side edges from which flexible hinge portions extend, and a pair of rectangular cover portions having respective side edges joined to said hinge portions so that said cover portions are swingable relative to each other about said hinge portions between closed positions, in which said cover portions extend substantially parallel to each other from said spine portion with inner surfaces of said cover portions in confronting relation, and opened positions in which said cover portions are spread angularly apart, means on said cover portions for holding respective disc-shaped recording media in their rectangular housings against said inner surfaces of the respective cover portions, and holder means on said spine portion extending from the latter between said cover portions in said closed positions of the latter for embracing and holding at least one additional disc-shaped recording medium at an edge portion of its respective rectangular housing so as to accommodate said at least one additional disc-shaped recording medium in its respective housing between said disc-shaped recording media in their respective housings held against said inner surfaces of the cover portions, the respective housing of said at least one additional disc-shaped recording medium being in contact with said holder means only at said edge portion embraced and held by said holder means.

2. A storage case as in claim 1; in which said holder means on the spine portion includes flanges extending substantially parallel to said opposed side edges of the spine portion and being spaced apart from each other to frictionally retain therebetween said edge portion of the housing of said at least one additional disc-shaped recording medium 3. A storage case as in claim 2; in which there are two of said flanges spaced apart to accommodate therebetween only one of said additional disc-shaped recording media in its respective housing.

4. A storage case as in claim 2; in which there are two of said flanges spaced apart by substantially a multiple of the thickness of the rectangular housing for each said disc-shaped recording medium so that a corresponding plurality of said additional disc-shaped recording media in their housings can be accommodated in said holder means.

5. A storage case as in claim 2; in which there are at least three of said parallel flanges with each of said flanges being spaced from each of said flanges adjacent thereto by a distance approximately equal to the thickness of the rectangular housing for each said disc-shaped recording medium so that a single disc-shaped recording medium in its housing can be accommodated between each two adjacent flanges.

6. A storage case as in claim 2; in which said flanges taper in the direction away from said spine portion so as to define confronting flange surfaces that diverge toward free edges remote from said spine portion for facilitating the entry of an edge portion of the housing of a disc-shaped recording medium between said confronting flange surfaces, and spaced apart ribs extending from said confronting flange surfaces substantially at right angles to said free edges thereof for defining limited zones at which said flanges frictionally grip the housing of a disc-shaped recording medium therebetween.

7. A storage case as in claim 6; in which said ribs extending from one of said confronting flange surfaces are offset, in the direction along the respective flange, relative to said ribs extending from the other of said confronting flange surfaces.

8. A storage case as in claim 2; in which the housing of each said disc-shaped recording medium has a recess in an edge thereof, and said spine portion has a projection extending therefrom between said flanges and being shaped to be received in said recess of the housing of said additional disc-shaped recording medium for ensuring that the latter has a predetermined orientation within the storage case.

9. A storage case as in claim 2; in which said opposed side edges of said spine portion extend laterally beyond the outermost of said flanges by distances each approximately equal to the thickness of the housing of each said disc-shaped recording medium so that said housings held against said inner surfaces of the respective cover portions can, in said closed positions of the cover portions, extend between said outermost flanges and the respective cover portions.

10. A storage case as in claim 2; in which said means on said cover portions for holding respective disc-shaped recording media in their rectangular housings include, on each of said cover portions, integral pairs of spaced apart lugs extending from said inner surface of the respective cover portion with the distance between said lugs of each of said pairs thereof being approximately equal to one of the orthogonal dimensions of the rectangular housing to be held thereby so that each of the disc-shaped recording media held in its respective rectangular housing against the inner surface of the respective cover portion has edges of said rectangular housing frictionally retained by the respective pairs of said lugs.

11. A storage case as in claim 10; in which the ones of said pairs of lugs closest to said hinge portions are spaced from the latter by distances at least as large as the depth of said flanges measured from said spine portion to free edges of said flanges so that the rectangular housings held by said lugs against the inner surfaces of said cover portions will clear said flanges when said cover portions are in said closed positions.

12. A storage case as in claim 10; wherein said lugs of each of said pairs thereof have confronting faces with ribs extending therefrom for defining limited zones at which said lugs frictionally engage edges of the respective rectangular housings.

* * * * *